United States Patent [19]
Mori

[11] Patent Number: 4,877,947
[45] Date of Patent: Oct. 31, 1989

[54] TRANSACTION PROCESSING SYSTEM

[75] Inventor: Toru Mori, Tokyo, Japan

[73] Assignee: Oki Electric Industry Co., Ltd., Tokyo, Japan

[21] Appl. No.: 79,454

[22] Filed: Jul. 30, 1987

[30] Foreign Application Priority Data

Aug. 5, 1986 [JP] Japan .................. 61-182730

[51] Int. Cl.$^4$ ............................. G06F 15/21
[52] U.S. Cl. ..................... 235/381; 235/379; 340/825.34; 340/825.35; 902/22; 902/26; 364/405
[58] Field of Search ............. 235/379, 380, 381; 340/825.35, 825.33, 825.34; 364/405; 902/22, 26, 41

[56] References Cited

U.S. PATENT DOCUMENTS

| 3,971,916 | 7/1976 | Moreno . | |
| 4,007,355 | 11/1977 | Moreno . | |
| 4,092,524 | 10/1978 | Moreno . | |
| 4,102,493 | 4/1978 | Moreno . | |
| 4,213,179 | 7/1980 | Hamano et al. | 364/405 |
| 4,453,074 | 6/1984 | Weinstein | 235/380 |
| 4,549,075 | 10/1985 | Saada et al. | 235/380 |
| 4,594,663 | 6/1986 | Nagata et al. | 235/380 |
| 4,678,895 | 7/1987 | Tateisi et al. | 235/380 |
| 4,683,536 | 7/1987 | Yamamoto | 235/380 |
| 4,689,478 | 8/1987 | Hale et al. | 235/380 |
| 4,707,594 | 11/1987 | Roth | 235/380 |
| 4,722,054 | 1/1988 | Yorozu et al. | 235/380 |
| 4,747,049 | 5/1988 | Richardson et al. | 235/380 |
| 4,752,677 | 6/1988 | Kakano et al. | 235/380 |
| 4,799,061 | 1/1989 | Abraham et al. | 340/825.34 |

FOREIGN PATENT DOCUMENTS 2066540 7/1981 United Kingdom .

Primary Examiner—A. D. Pellinen
Assistant Examiner—H. L. Williams
Attorney, Agent, or Firm—Spencer & Frank

[57] ABSTRACT

A transaction processing system using a prepaid microchip card includes a customer's microchip card reader/writer for communicating with a customer's microchip card in which a balance is recorded, and a vendor's microchip card reader/writer that can be electrically coupled to the customer's microchip card reader/writer and is used for communicating with a vendor's microchip card in which a balance is recorded. A transaction is processed by deducting the amount of the transaction from the balance in the customer's microchip card and adding this amount to the balance in the vendor's microchip card.

5 Claims, 6 Drawing Sheets

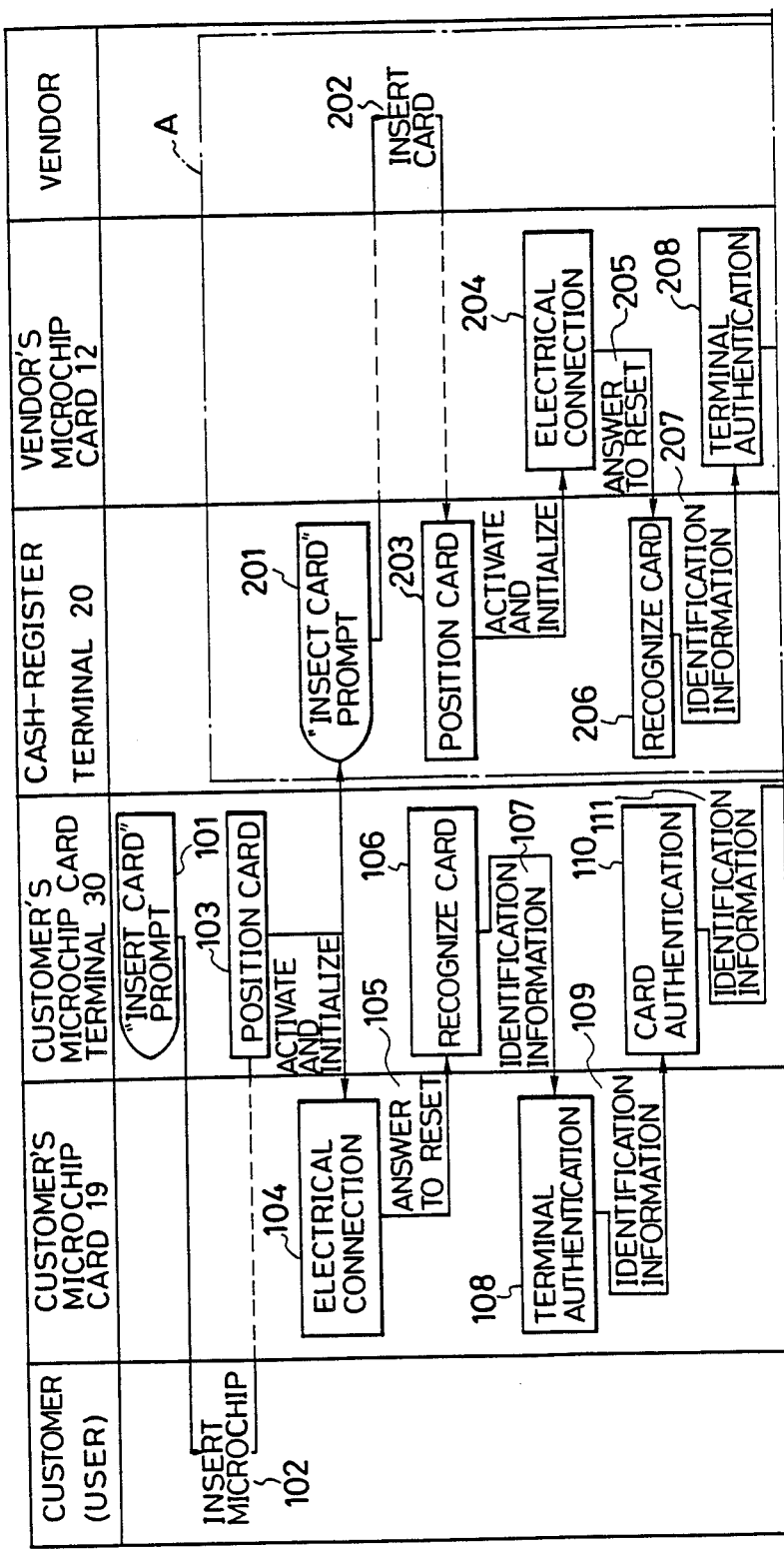

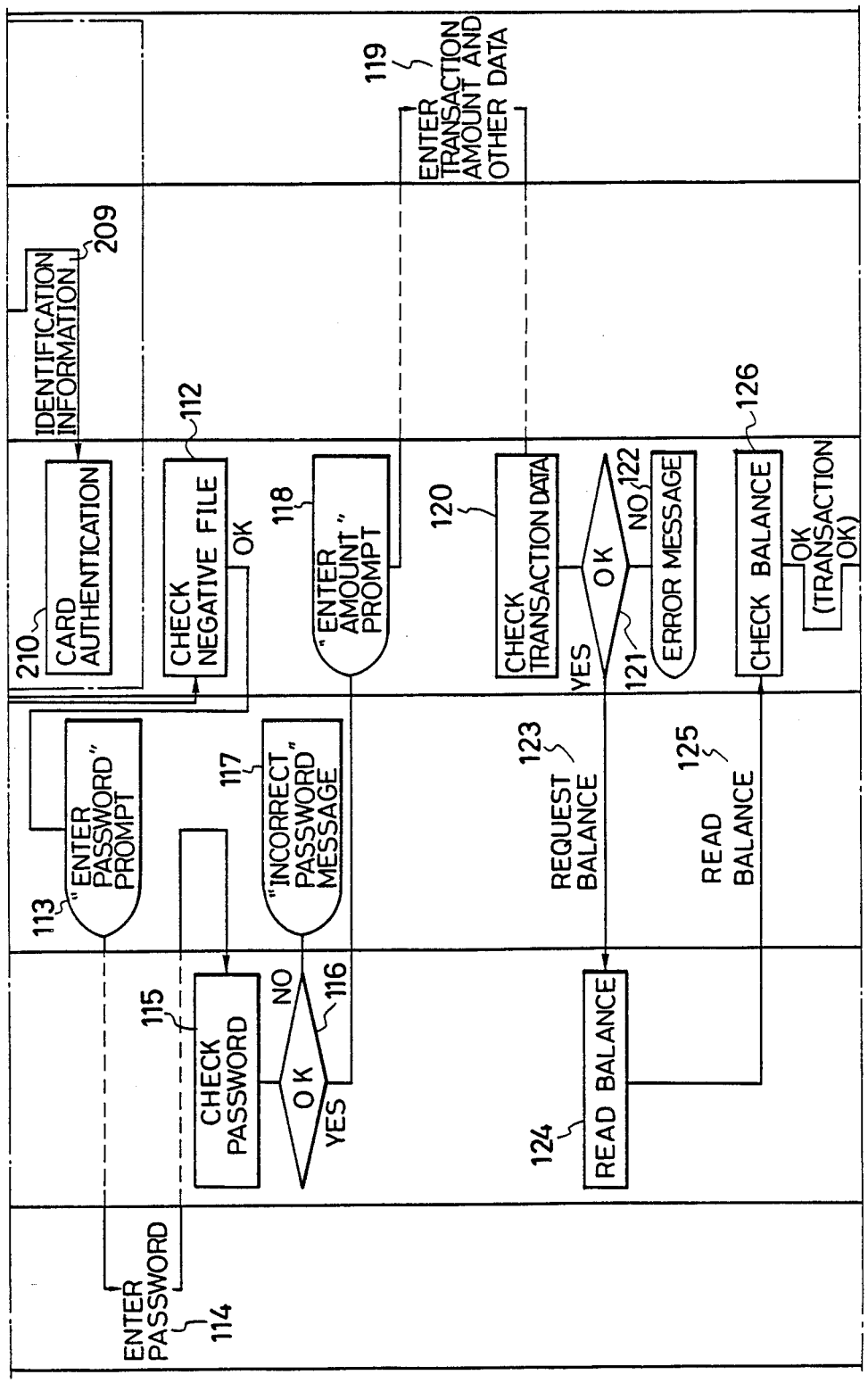

TRANSACTION PROCESSING SYSTEM

BACKGROUND OF THE INVENTION

This invention relates to a system for processing commercial transactions by means of a card issued by a financial institution, and in particular to such a system that uses a prepaid microchip card in which balance information is recorded.

The invention is typically, but not exclusively, applicable to transactions, such as purchase transaction, at a retail establishment such as a department store, supermarket or smaller retail store.

Cards are widely used to effect many kinds of commercial transactions. The type of card most commonly used is the credit card, which identifies the bearer by means of his signature and allows him to make purchases on credit up to a certain limit amount. Although credit card systems have proven extremely convenient, they are not free from abuse: by making many purchases in different places a card user can spend many times the credit limit and exceed his ability to repay when billed later; by generating false transaction records a store can charge card users for purchases not actually made. Another problem is the extensive postprocessing involved: the vendor in a credit-card transaction must submit individual records of the transaction to obtain reimbursement from the financial institution that issued the card.

Recently another type of card, called a prepaid card or debit card, has come into use. A prepaid card differs from a credit card in that a monetary balance is recorded in the card. To acquire the card, the user pays an amount of cash equivalent to the initial balance. Thereafter, each time a transaction is paid for with the card, the balance recorded in the card is reduced by the amount of the transaction. Prepaid cards are used in Japan by the Nippon Telephone and Telegraph Corporation (NTT) and the Japanese Railways. In both of these systems the balance information is recorded in the card by magnetic means.

Although these prepaid cards eliminate the problem of overspending by the customer, they have other drawbacks. One is their noninterchangeability: telephone cards can be used only in public telephones; railway cards can be used only in railway ticket vending machines. Another problem is that when the balance in the card is reduced to zero, the utility of the card is exhausted and the user must acquire a new card.

Recent progress in semiconductor technology now makes it possible to produce much more sophisticated cards, having embedded microchip semiconductor devices such as microprocessors and memories. Since they can store large amounts of information and can process the information, such microchip cards (also called IC cards) offer many advantages over conventional cards that record data by magnetic means. These advantages can be put to use in prepaid card systems.

In one prepaid microchip card system that has been proposed, the card's memory contains a balance that can be both increased and reduced. Unlike a magnetic card, such a microchip card would not become used up: after spending the balance in it, the user could recharge the card by transferring funds into it from a bank account via an automatic teller terminal. The card could also be provided with a password for preventing unauthorized use.

Like a credit card, such a prepaid microchip card could pay for transactions at a variety of different commercial establishments. It could be used at any establishment equipped with a cash-register terminal capable of debiting the balance in the card. Also as in a credit-card system, however, the vendor in the transaction would have to be reimbursed through later postprocessing. The vendor would have to submit records of the transaction to the financial institution that issued the card, a process involving much work and presenting opportunities for fraudulent manipulation. Such opportunities include both fraudulent alteration of the transaction records on the paper, flexible-disk, or other media on which they are kept, and fraudulent input to the vendor's terminal controller.

SUMMARY OF THE INVENTION

An object of the present invention is to eliminate unnecessary postprocessing in a prepaid microchip card transaction processing system by reducing the transaction to a card-to-card transfer of funds, thereby saving labor and decreasing the risk of fraudulent manipulation.

This invention is a prepaid microchip card transaction processing system comprising a customer's microchip card reader/writer for communicating with a customer's microchip card in which a balance is recorded, and a vendor's microchip card reader/writer that can be electrically coupled to the customer's microchip card reader/writer and communicates with the vendor's microchip card in which a balance is recorded.

When a transaction is conducted, the customer inserts the customer's microchip card in the customer's microchip card reader/writer and enters a password on an attached keypad. The vendor enters the amount of the transaction on a keypad connected to the vendor's microchip card reader/writer, in which the vendor's microchip card is inserted. The amount of the transaction is communicated from the vendor's microchip card reader/writer to the customer's microchip card reader/writer, then from the two microchip card reader/writers to both microchip cards. With suitable verification, the amount of the transaction is deducted from the balance recorded in the customer's microchip card and added to the balance recorded in the vendor's microchip card.

Later, the vendor can transfer the balance recorded in the vendor's microchip card to a bank account or convert it to cash by a simple process performed at a financial institution.

DETAILED DESCRIPTION OF THE PREFERRED EMBODIMENTS

Figure 1:
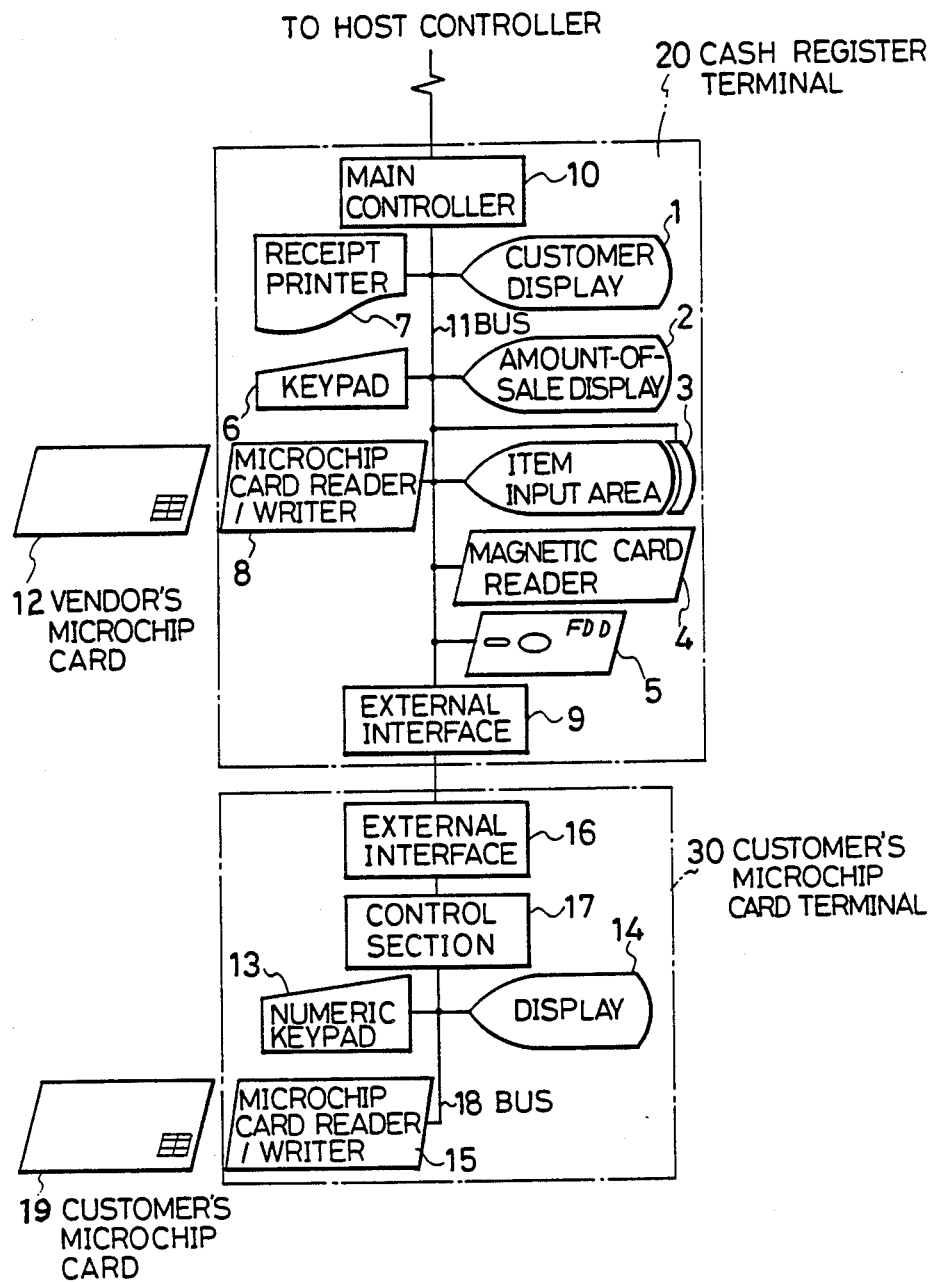
FIG. 1 is a block diagram of an embodiment of the present invention.

The attached drawings illustrate a preferred embodiment of this invention. As indicated in FIG. 1, the embodiment comprises a cash-register terminal 20 coupled to a host controller (such as a central computer) and a customer's microchip card terminal 30 coupled to the cash-register terminal 20. First the cash-register terminal will be described with reference to FIGS. 1 and 2.

Figure 2:
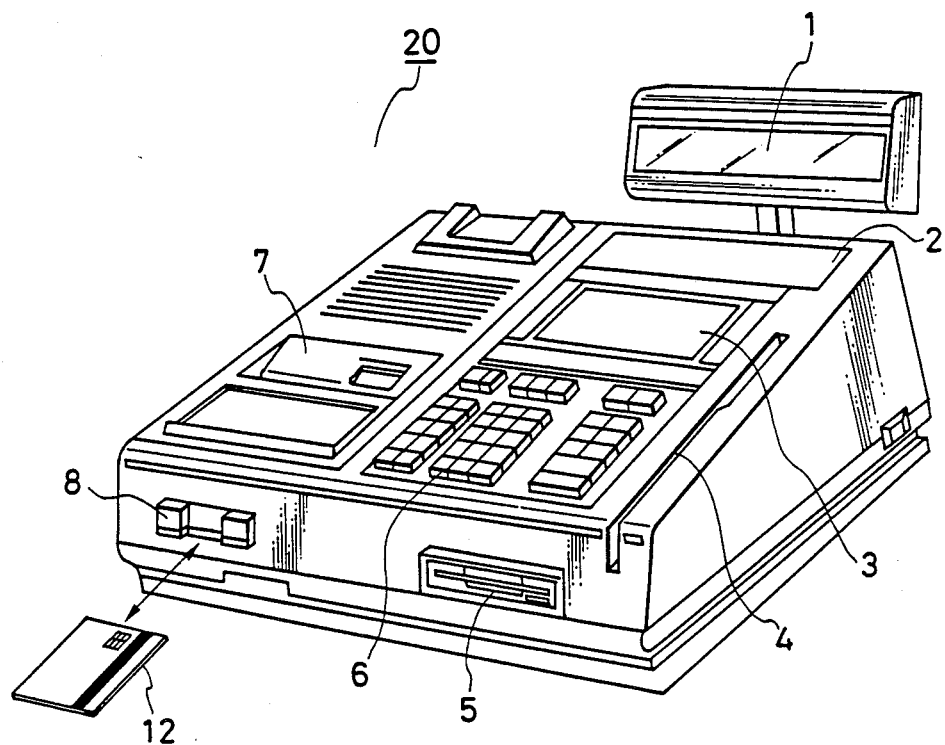
FIG. 2 shows the cash-register terminal used in this embodiment.

The cash-register terminal 20 is a device operated by the vendor in the transaction. With reference to FIG. 2, the customer display 1 is a liquid-crystal or light-emitting-diode device for displaying the amount of the sale to the customer. The amount-of-sale display 2, which enables the operator to confirm the amount of the sale, is a liquid-crystal or light-emitting-diode device similar to the customer display 1. The item input area 3 comprises a display device such as a CRT provided with a touch sensor on its surface. The manual magnetic card reader 4 reads information from a magnetic stripe on a card which is inserted in a groove and moved by hand for scanning. The manual magnetic card reader 4 takes no direct part in the transactions conducted in this embodiment, but is provided for a variety of purposes for which the cash-register terminal 20 might require a magnetic stripe scanner. The flexible disk drive 5 (FDD) enables the system program of the cash-register terminal 20, sales information, and other information to be stored on, for example, a 3.5-inch flexible disk. The keypad 6 comprises a plurality of keys which the operator presses to enter necessary information. The receipt printer 7 prints transaction information on a journal strip and receipt, which it then ejects. The vendor's microchip card reader/writer 8 communicates with semiconductor devices such as a microprocessor and memory embedded in a microchip card 12. The communication may take place through electrical contacts on the surface of the card, or by noncontacting means that have been proposed. The external interface 9 mediates the transfer of data to and from the customer's microchip card terminal 30. The main controller 10 controls all of the components 1 through 9, which are connected to a bus 11.

Figure 3:
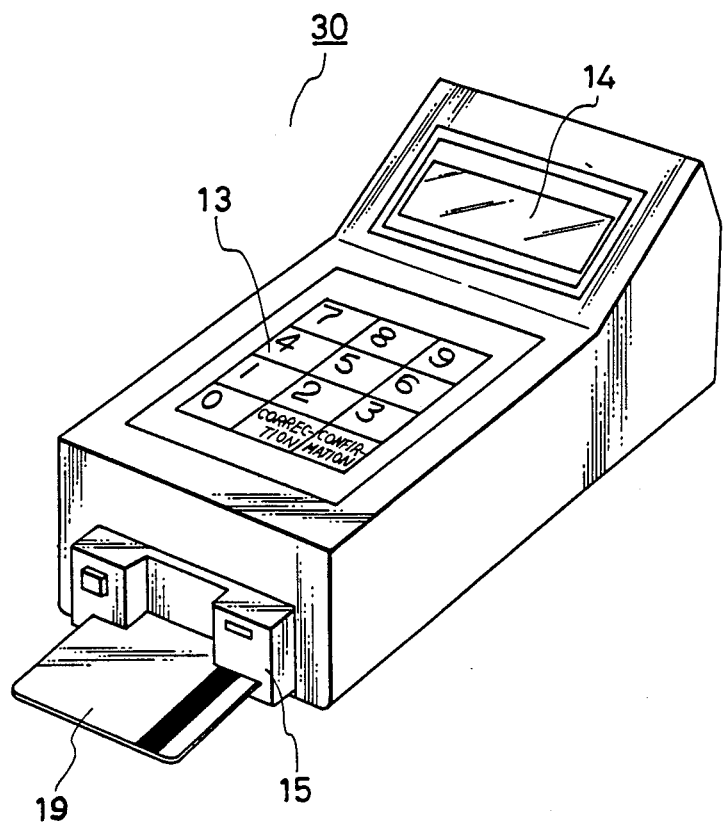
FIG. 3 shows the customer's microchip card terminal.

Next the customer's microchip card terminal 30 will be described with reference to FIGS. 1 and 3. The customer's microchip card terminal 30 comprises a keypad 13, a display 14, a microchip card reader/writer 15, a control section 17, a bus 18, and an external interface 16. The customer uses the numeric keypad 13 to enter a password, e.g., a numeric code known only to the customer. The display 14, which is a liquid-crystal or similar device, prompts the customer the entry of the password and other operations such as inserting and removing the card. The microchip card reader/writer 15 communicates with semiconductor devices embedded in a customer's microchip card 19. The external interface 16 mediates the transfer of data to and from the cash-register terminal 20. The control section 17 receives commands from the main controller 10 in the cash-register terminal 20 and controls the components 13 through 16, which are all coupled to the bus 18.

Figure 4C:
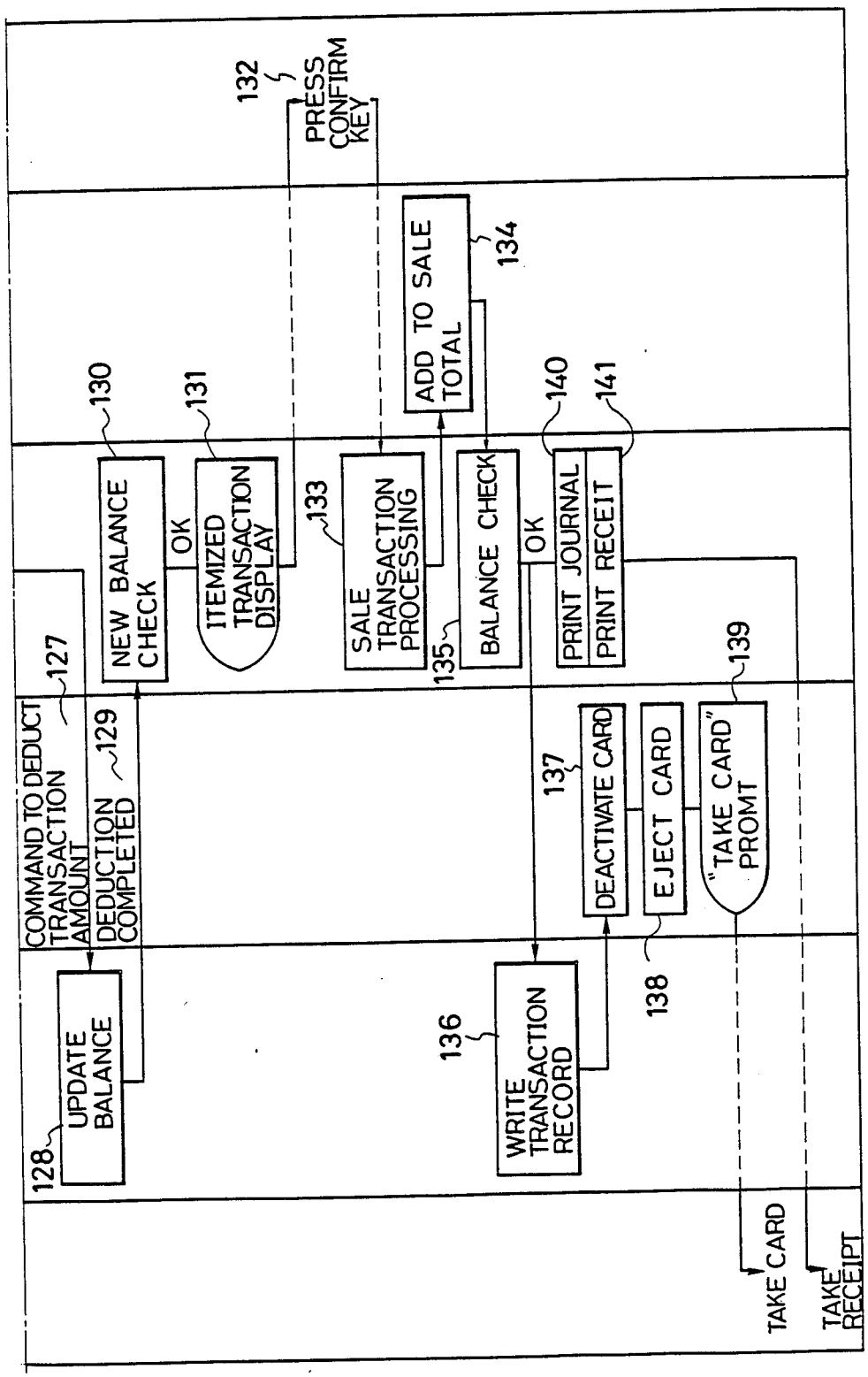
FIG. 4 is a flowchart of the processing of a transaction.

When a transaction is conducted by means of this embodiment, a process takes place consisting of the steps shown in FIG. 4. The process begins with a prompt on the customer's microchip card terminal 30 instructing the customer to insert the customer's microchip card 19 (step 101). The customer inserts the card to the necessary position (step 102), thereby establishing an electrical coupling between it and the microchip card reader/writer 15 (step 103). When positioning is completed, the microchip card reader/writer 15 applies a voltage that activates the customer's microchip card 19, which then initializes itself (step 104). After initialization, the customer's microchip card 19 sends basic "Answer to Reset" information to the control section 17 via the microchip card reader/writer 15 (step 105). This information indicates, for example, what type of card the customer's microchip card is and what protocol it will use in communicating with the customer's microchip card terminal 30. From this information, the customer's microchip card terminal 30 determines whether it is able to undertake a transaction with the microchip card 19 inserted by the customer (step 106). If the transaction can be undertaken, next the customer's microchip card terminal 30 and the customer's microchip card 19 carry out a mutual authentication process by exchanging and checking identification information establishing that the one is a valid terminal and the other is a valid card (steps 107 to 110).

A process similar to the process described so far is carried out when the vendor's microchip card 12 is inserted in the cash-register terminal 20 shown in FIG. 2 (steps 201 to 210 in block A). The vendor's microchip card 12 can be left in the cash-register terminal 20 instead of being inserted and removed separately at each transaction.

After completion of authentication in step 110, the control section 17 of the customer's microchip card terminal 30 sends the card identification information received in step 109 to the cash-register terminal 20 via the external interface 16 (step 111). The main controller 10 of the cash-register terminal 20 receives the identification information sent from the customer's microchip card terminal 30 via its external interface 9 and compares it with a negative file (a list of disallowed cards) received from the host controller (not shown in the drawing) to check that the use of this customer's microchip card 19 has not been proscribed (step 112). If the use of this card has not been proscribed, the main controller 10 commands the customer's microchip card terminal 30 to prompt the customer to enter the password. When it receives this command, the control section 17 causes the display 14 to display a prompt for entry of a password, such as "ENTER PASSWORD" (step 113), and the customer responds by keying in the password (step 114). The control section 17 receives the password and sends it through the microchip card reader/writer 15 to the customer's microchip card 19. The customer's microchip card 19 compares the password received with a password stored in its memory to confirm the identity of the customer (step 115). If the result, given in step 116, is that the password does not match, the customer's microchip card 19 informs the control section 17 via the microchip card reader/writer 15 of the mismatch and the control section 17 displays a message indicating that the password was incorrect, such as "INCORRECT PASSWORD" on the display 14 (step 117). If the result in step 116 is that the password matches, the customer's microchip card 19 notifies the main controller 10 of the cash-register terminal 20 via the microchip card reader/writer 15, the control section 17, and the external interface 16 that the password is correct.

When notified that the password is correct, the main controller 10 causes a prompt to be displayed on the item input area 3 instructing the vendor to enter the monetary amount of the transaction and other items of transaction data (step 118). The vendor enters the requested data on the keypad 6 (step 119). The main controller displays the amount of the transaction on the customer display 1 and checks the validity of the transaction data entered (step 120). If the result of this check, obtained in step 121, is that the transaction data are invalid, the main controller 10 displays a message indicating the invalidity, such as "ERROR" on the item input area 3 (step 122) and the vendor enters the data again. If the result in step 121 is that the transaction data are valid, the main controller 10 sends a request via the customer's microchip card terminal 30 to the customer's microchip card 19 for the balance information recorded in the memory of the customer's microchip card 19 (step 123).

When it receives this request, the customer's microchip card 19 reads the balance information recorded in its memory (step 124) and reports it to the cash-register terminal 20 via the customer's microchip card 30 (step 125). The main controller 10 then compares (step 126) the reported balance information with the amount of the transaction entered in step 119. If the balance is inadequate for the transaction, the main controller 10 displays a message indicating that the balance is inadequate, such as "INADEQUATE FUNDS" on the customer display 1. If the balance is adequate for the transaction, the main controller 10 commands the customer's microchip card 19 via the customer's microchip card terminal 30 to deduct the amount of the transaction from the balance in its memory (step 127). In response to this command the customer's microchip card 19 updates the balance recorded in its memory (step 128) and notifies the cash-register terminal 20 via the customer's microchip card terminal 30 of the new balance after the update (step 129). The main controller 10 then subtracts (step 130) the amount of the transaction given in step 127 from the balance reported in step 125 and checks whether the result equals the new balance reported in step 129. If this check passes, the main controller 10 displays an itemized breakdown of the transaction in the item input area 3 (step 131). From this itemized display the vendor confirms that the correct amount has been paid and presses a confirmation key on the keypad 6 or touches an equivalent sensor on the item input area 3 (step 132).

When notified of this confirmation, the main controller 10, operating via the microchip card reader/writer 8, reads the balance recorded in the vendor's microchip card 12 and sends the amount of the transaction to this card (step 133). The vendor's microchip card 12 adds the amount of the transaction to the balance in its memory (step 134), and sends resultant new balance and the amount of the transaction back to the cash-register terminal 20 for checking. The main controller 10 checks that the reported amount of the transaction is correct, adds it to the balance read in step 133, and checks that the result equals the reported new balance (step 135). If these checks pass, the main controller 10 sends the customer's microchip card 19 via the customer's microchip card terminal 30 a command to write record of the transaction and the customer's microchip card 19 writes in its memory a record comprising information such as the date, amount, and place of the transaction (step 136).

When this process is completed, the customer's microchip card 19 is deactivated by the microchip card reader/writer 15 on command from the control section 17 (step 137) and ejected (step 138) so that it can be retrieved by the customer. The control section 17 also displays a message prompting retrieval of the card such as "TAKE CARD" on the display 14 (step 139). In parallel with steps 137 through 139, the main controller 10 in the cash-register terminal 20 commands the receipt printer 7 to to print a journal record for the vendor (step 140) and a receipt for the customer (step 141).

This completes the transaction process. If the customer finds from the receipt any error, e.g., overcharge, he can request the same type of correction as in a cash transaction.

In this embodiment, the cash-register terminal 20 and the customer's microchip card terminal 30 were described as being housed separately, but they could also be integrated into a single unit. Other modifications may also be made without departing from the scope of the invention.

What is claimed is:

1. A transaction processing system using a prepaid microchip card, comprising
    a customer's microchip card in which a balance is recorded,
    a vendor's microchip card in which a balance is recorded,
    a terminal means for exchanging data between said customer's microchip card and said vendor's microchip card, for inputting the amount of a transaction, for instructing the customer's microchip card to perform the deduction, and for instructing the vendor's microchip card to perform the addition, said terminal means including a first terminal having a vendor's microchip card reader/writer disposed therein for communicating with said vendor's microchip card, and a second terminal which is electrically coupled to said first terminal for exchange of data therebetween, said second terminal having a customer's microchip card reader/writer disposed therein for communicating with said customer's microchip card,
    said customer's microchip card having a function of authentication of said second terminal, and
    said vendor's microchip card having a function of authentication of said first terminal,
    wherein a transaction is processed by deducting the amount of the transaction from the balance in the customer's microchip card and adding said amount to the balance in the vendor's microchip card, and
    said transaction processing is performed after the authentication by the customer's microchip card and the vendor's microchip card.

2. A system according to claim 1, wherein the customer's microchip card comprises means for deducting the amount of transaction from the balance to determine a new balance, and for storing the new balance.

3. A system according to claim 1, wherein the vendor's microchip card comprises means for adding the amount of transaction to the balance to determine a new balance, and for storing the new balance.

4. A system according to claim 1, wherein the terminal means further comprises means for inputting a password for confirmation of the identity of the customer, and wherein said customer's microchip card reader/writer means comprises means for writing the input password in the customer's microchip card, upon which the customer's microchip card compares the input password and the password stored therein.

5. A system according to claim 1, wherein said terminal means further comprises:
    a keyboard provided on said first terminal to input the amount of a transaction, and
    a keyboard provided on said second terminal for inputting a password for confirmation of the identity of the customer, and means for writing the input password in the customer's microchip card, upon which the customer's microchip card compares the input password and the password stored therein for confirmation of the identity of the customer.

* * * * *